United States Patent [19]

Sirieix et al.

[11] Patent Number: 4,771,175
[45] Date of Patent: Sep. 13, 1988

[54] PARALLEL SCAN THERMAL CAMERA

[75] Inventors: Michel Sirieix, Jouy En Josas; Henri Pruvot, Paris; Albin Virdis, Savigny Sur Orge, all of France

[73] Assignee: SAT (Societe Anonyme de Telecommunications, Paris, France

[21] Appl. No.: 938,882

[22] Filed: Dec. 8, 1986

[30] Foreign Application Priority Data

Dec. 10, 1985 [FR] France .................. 85 18236

[51] Int. Cl.⁴ .......................................... H01L 25/00
[52] U.S. Cl. ..................................... 250/332; 250/334
[58] Field of Search ................. 250/332, 330, 334; 358/113, 174, 177; 377/57, 60

[56] References Cited

U.S. PATENT DOCUMENTS

| | | | |
|---|---|---|---|
| 3,823,263 | 7/1974 | Guppy | 358/174 |
| 3,873,836 | 3/1975 | Greene | 250/330 |
| 4,031,393 | 6/1977 | Redman | 250/332 |
| 4,054,797 | 10/1977 | Milton et al. | 250/332 |
| 4,093,872 | 6/1978 | Hartman et al. | 377/60 |
| 4,143,269 | 3/1979 | McCormack et al. | 250/332 |
| 4,178,522 | 12/1979 | MacLennan et al. | 250/332 |
| 4,225,883 | 9/1980 | Van Atta et al. | 250/334 |
| 4,286,278 | 8/1981 | Lorenze, Jr. et al. | 250/332 |
| 4,337,395 | 6/1982 | Alexander et al. | 250/332 |
| 4,390,785 | 6/1983 | Faulhaber et al. | 250/330 |
| 4,399,464 | 8/1983 | Hix et al. | 358/113 |
| 4,403,148 | 9/1983 | Coon et al. | 250/332 |

FOREIGN PATENT DOCUMENTS 2548498 1/1985 France .
2142800 1/1985 United Kingdom .

Primary Examiner—Janice A. Howell
Assistant Examiner—William F. Rauchholz
Attorney, Agent, or Firm—Stevens, Davis, Miller & Mosher

[57] ABSTRACT

The camera includes a chip of infrared detectors disposed in lines and a processing chip. The latter comprises integrators for integrating the output currents of the detectors, controlled by an automatic gain control loop for reducing the dynamic of the signal, delay lines, a summator for each line of detectors, error correction devices for reducing the fixed spatial noise errors, and a multiplexer receiving the signals associated with the various lines of detectors and furnishing a signal to a display device.

12 Claims, 3 Drawing Sheets

PARALLEL SCAN THERMAL CAMERA

BACKGROUND OF THE INVENTION

The present invention relates to a parallel scan thermal camera including a chip of infrared detectors disposed in lines and a chip for processing the detection signals including means for integrating the output currents of the detectors and delivering charge amounts associated with each of the lines of detectors.

Such a camera is used nowadays more particularly in the image formation field, for analysing landscapes in real time for example.

For a uniform illumination or background, the charge amounts vary from one line of detectors to the other, which contributes to creating the phenomenon of false contrast, or fixed spatial noise, and which adversely affects the quality of the images. This noise in fact originates in the dispersion of the currents delivered by the different detectors because of the variations of the cut off wavelengths, the dark currents, the impedances, the quantum efficiencies and sensitive areas, the bias voltages.

To avoid saturation of the processing circuits by this phenomenon and so that the quality of the images obtained is not spoiled too much, a certain dynamic is then required with respect to the noise level, to which must be added the dynamics proper to the detection signals which depends on the temperature differences considered.

For solving the problem raised by fixed spatial noise, it might then be considered desirable to store the different false contrast charge levels, preferably in digital form, before proceeding to a comparison with the charge levels of the detection singals. Considering the above mentioned dynamics, in practice of the order of 1000, an analog/digital (A/D) conversion of the signals would then be required which is compatible in accuracy, i.e. over 11 or 12 bits and at a high speed, namely over a period of the order of 500 to 600 ns if 18 lines of detectors are scanned in 10 μs.

There exist at the present time on the market A/D 8 bit-500 ns converters but no 12 bit converter.

The present invention aims at filling this gap.

SUMMARY OF THE INVENTION

To this end, the present invention relates to a parallel scan thermal camera having a chip of infrared detection diodes disposed in lines and a chip for processing the detection signals having means for integrating the output currents of the detectors and delivering detection charge amounts associated with each of the lines of detectors, the two chips being hybridized, further including means for controlling the gain of the signals detected and processed and means, having means for converting charges into voltages, connected to a reference voltage generator by a capacitive connection, and means for showing to the detection diodes a uniform reference background at a given temperature during each scan return for determining, for each line of detectors, the difference between the detection charge amounts and the charge amounts associated with the reference background.

It will be noted that the French Patent application No. 2 548 498 already taught a concept similar to the one which is applied to the camera of the invention.

But this document did not provide for application thereof to a thermal camera, with hybridized detection chip and processing chip, did not provide for mounting the uniform temperature scene during each scan return and for a good reason since it was not a question of a camera and finally did not provide for connection of the charge conversion means to a reference voltage generator by a capacitor which is the component allowing the differences between the detection charge amounts and the reference charge amounts to be determined accurately.

With the gain control, signal dynamics may be appreciably reduced; to take up the example mentioned above, under the conditions of the invention an 8 bit A/D converter would be amply sufficient.

Since the charge level dispersions, with reduction of signal dynamics, would have taken on a considerable harmful importance, the invention also provides a reduction, not to say a cancellation, of the fixed spatial noise dynamics. In fact, by only retaining the difference between the detection charge levels and the reference charge levels only the useful part of the information is retained, consequently overcoming the fixed spatial noise error related essentially to the reference charge amounts.

Preferably, the means for controlling the gain of the signals detected and processed are automatic gain control means controlling, as a function of the mean amplitude of the signals, the means for integrating the output currents of the detectors.

Advantageously, the control means control the integration time of the integration means by means of a clock with variable cyclic ratio.

Preferably, the integration means include a first storage integrator and a second dump integrator connected alternatley to their associated detector by a switch. Even more preferably, the means for integrating the output currents of the detectors include input field effect transistors of the processing chip, connected directly to their respective detectors and the input field effect transistors are integrated in a silicon substrate, they each include a storage well as drain and are each followed by a space adapted to be filled with minority carriers under the action of a transfer chip, and a second storage well, the drain of the input transistors forming the source of the dump field effect transistors.

BRIEF DESCRIPTION OF THE DRAWINGS

The invention will be better understood from the following description of the camera of the invention, with reference to the accompanying drawings in which.

DESCRIPTION OF THE PREFERRED EMBODIMENT

Figure 1:
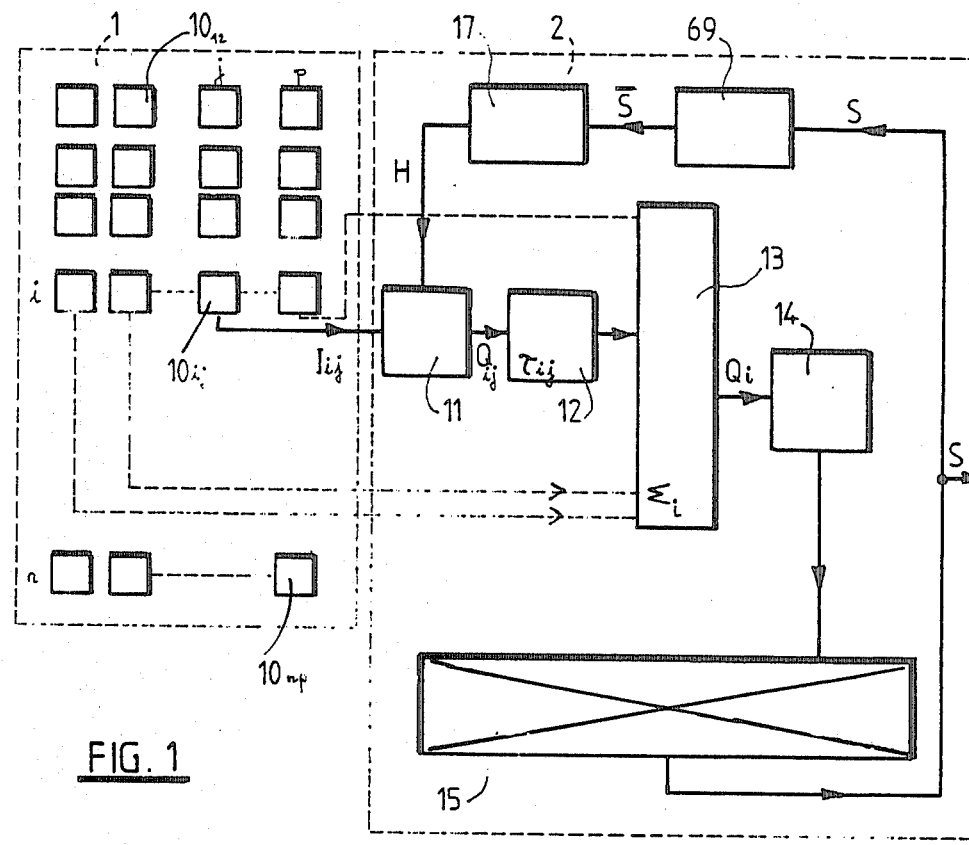
FIG. 1 shows schematically the detection chip and the processing chip of the camera.
Figure 2:
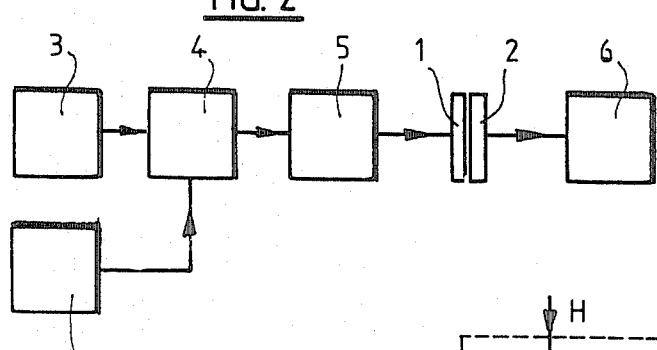
FIG. 2 shows schematically the whole of the elements of the camera.

Schematically, the detection chip 1 and the processing chip 2 of the thermal camera of the invention, which are the essential elements thereof, are shown in FIG. 1. Chips 1,2 are inserted in an assembly of other elements which are perfectly well known and whose existence will only be briefly recalled here, with reference to FIG. 2. The camera includes, in series, an infrared optical system 3, an analysis or scanning system 4, a concentration optical system 5, the detection and processing chips 1,2 and a display device 6. The scanning system 4 includes essentially a pivotally mounted mirror for causing the landscape to be analyzed to pass in front of the fixed detectors of chip 1.

Chip 1 includes a mosaic, or matrix, of $n \times p$ infrared detectors 10 disposed in n lines of p detectors. For practical reasons of manufacture, the n lines of detectors 10 are disposed differently from the arrangement of FIG. 1, in a staggered arrangement along 2p columns of n/2 elements. From the technological point of view, which will be again discussed further on in greater detail, the detectors are advantageously cadmium mercury telluride photodiodes (Hg Cd Te) each connected to the circuit of the processing chip 2, which is a silicon circuit of the transfer charge type, or CCD, or a similar type. The two chips 1,2 are superimposed, and we speak of a hybrid component, and diodes 10 are connected to the circuit of chip 2 for example by beam leads or similar connections. For the sake of clarity, only the connections of the diodes of line i have been shown in FIG. 1 and more precisely the connection of the diode 10ij, showing the diode of line i and of column j. The diodes of a line are scanned successively one after the other.

The output current (Iij) of each diode (10ij) of each line (i) is processed in an integration and gain control device 11 which delivers a charge signal (Qij) to a delay line 12, in which it undergoes a given phase shift $\tau/ij$. The charge signals delivered by all the delay lines 12 associated with the diodes of the same line are added in a summator 13. The signals delivered by all the summators 13 associated with the different lines of the detection chip 1 are each processed in an error correction device 14 before being multiplexed in a multiplexer 15 whose output signal S is applied to the display device 6. The delay lines 12 ensure the rephasing of the signals delivered by the detectors of the same line, integrated and controlled, which is necessary because of the geometrical dispersion of these detectors. When each line of detectors only comprises two detectors, a selection of the best one of the two detectors is made after multiplexing by appropriate and known means.

Figure 3:
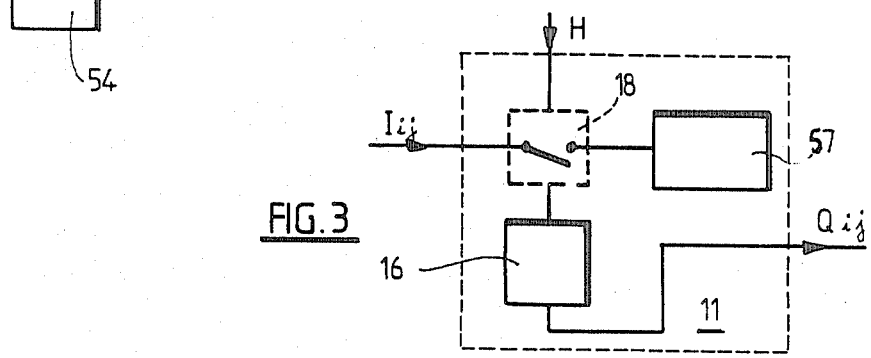
FIG. 3 shows schematically the means for integrating the output currents of the detectors of the detection chip of the camera.
Figure 4:
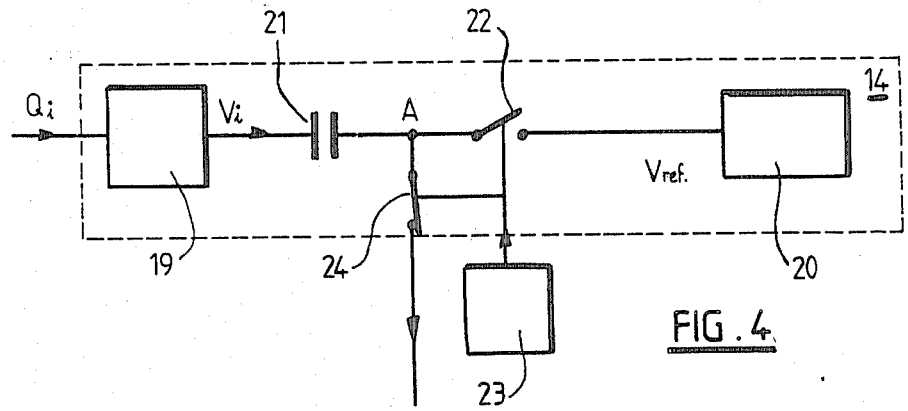
FIG. 4 shows schematically the error correction means of the processing chip of the camera.

The currents (Iij) delivered by the diodes (10ij) are integrated and transformed into charge amounts Qij in a storage integrator 16 (FIG. 3), whose integration time t is controlled by a clock 17 (FIG. 1) delivering a train of pulse H of width t and of period T, the cyclic ratio t/T being variable. Beyond the time t, the currents of the diodes are integrated, during the interval (T-t) in a second dump integrator, called "dustbin". The integration and control device 11 includes then two integrators 16, 57 connected alternately to their associated detection diodes by a switch 18 controlled by the clock 17. The cyclic ratio of the clock t/T and so the integration time t of the storage integrator 16 varies with the mean amplitude $\bar{S}$ of the signal S delivered by the multiplexer 15. This mean amplitude is measured in a device 69 connected to the variation control of the cyclic ratio of clock 17.

The loop of elements 16, 15, 69, 17, 16 forms an automatic gain control loop for reducing the signal dynamics. When the signal is too high, it is crushed.

After a delay in elements 12, the charge amounts (Qij) of the diode of a line i of diodes, designated by detection charge amounts, are added in the summator 13 which delivers a charge amount Qi of the whole of the corresponding line (i), which is processed in the error correction device 14. The charge amount Qi is transformed into a voltage Vi in element 19 by division by a capacitive magnitude C, connected to a generator 20 of the reference voltage $V_{ref}$ by a connection capacitor 21 and a switch 22. The correction device 14 is connected to the multiplexer 15 at point A, between capacitor 21 and switch 22 by another switch 24.

During each scan return, a uniform reference background 54 (FIG. 2), consequently at a given temperature, is shown to the diodes of all the lines. During these scan returns, the switch 22 is closed and switch 24 is opened by a device 23, in this case a sensor sensing the position of the scanning mirror, which fixes the potential of point A at $V_{ref}$.

During these scan returns, the potential difference at the terminals of the connecting capacitor 21 rises, for line i to $$V_{ref} - \frac{Q_{iref}}{C}$$

for line 1, to $$V_{ref} - \frac{Q_{1ref}}{C}$$

Qiref and Qlref, socalled reference charge amounts, being by nature different because of the fixed spatial noise, whereas the potential $V_{ref}$ is the same for all the lines. Following the scanning of a line of the image to be analyzed during which switch 22 is open and switch 24 closed, the potential difference at the terminals of the connecting capacity 21 becomes, for line i $$V_{ref} + \frac{Q_i - Q_{iref}}{C}$$

for line 1

$$V_{ref} + \frac{Q_1 - Q_{1ref}}{C}$$

The connecting capacitor allows then, for each line of detectors, the difference between the detection charge amounts and the reference charge amounts to be determined.

Whatever the level of the reference charges of a line, it is thus considered as zero level or reference level. In other words, a level, here of detection charges, is determined and in this case converted into a potential level, with respect to a reference level. Since it is essentially this reference level which is erroneous, because of the fixed spatial noise, this error is thus overcome. Again, in other words, only the useful part of the information is multiplexed. The error correction device 14 then for its part reduces or cancels out the fixed spatial noise dynamics.

It should be noted here that the value of $V_{ref}$ is determined so as to be between the maximum and minimum values of Vi.

In the preferred embodiment, the processing chip 2 of the camera of the invention is constructed in the technology which now be described.

Figure 5:
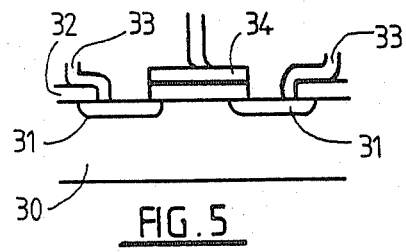
FIG. 5 shows schematically a field effect transistor.
Figure 6:
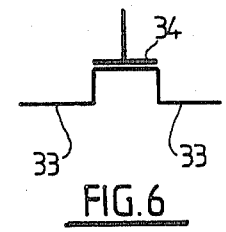
FIG. 6 shows the electric diagram of the transistor of FIG. 5.

Let us first of all recall briefly what a field effect transistor FET is with MOS structure shown in FIG. 5 and the electric diagram of which is shown in FIG. 6.

A substrate 30 of one type of conductivity has two doped zones 31 of the other type of conductivity diffused from two openings formed in an oxide layer 32. Two contact terminals 33 connected to the two doped zones 31 form the drain and the source. A metal layer 34, on the oxide layer 32, between the two doping openings, forms the gate and, connected to a third contact terminal, ensures biassing of the transistor. When the gate 34 has a voltage applied thereto, a space charge is formed thereunder which fills with minority carriers the space extending between the two doping zones 31 and which connects the source and drain 33,33 together.

Figure 7:
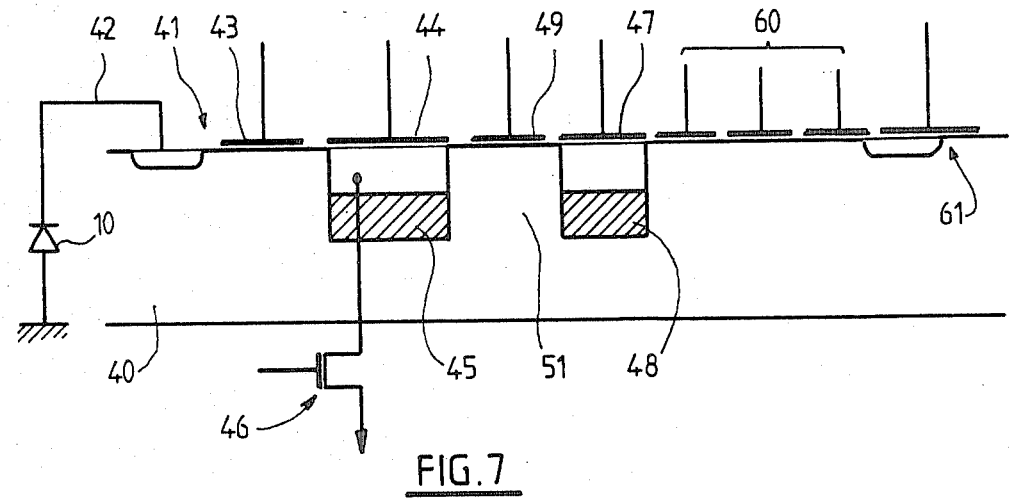
FIG. 7 shows the circuits, integrated on the silicon substrate, of the processing chip, of the integration means, of the gain control means and phasing means of the camera.

It is using this technology that the processing chip of the camera of the invention is formed, whose circuits are integrated on a silicon substrate 40 (FIG. 7).

Figure 8:
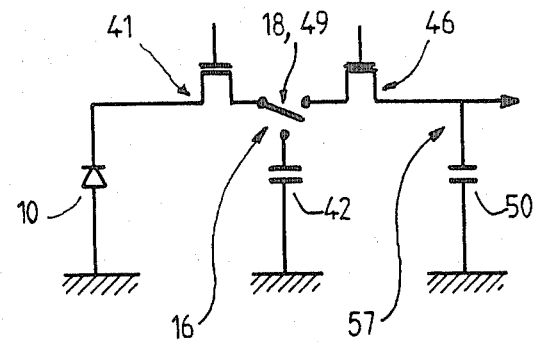
FIG. 8 shows the electric diagram of the integrated circuits of FIG. 7.
Figure 9:
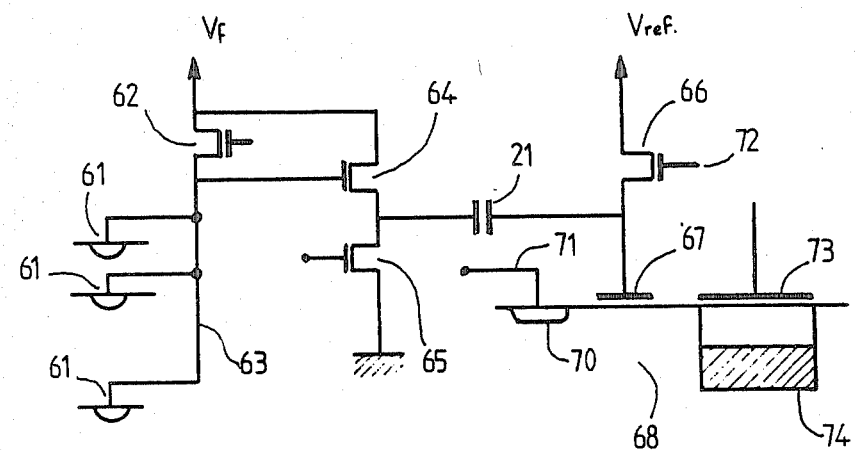
FIG. 9 shows the circuits, partially integrated and partially in their schematic electric form, of the summation, error correction and multiplexing means of the camera of the invention.

Let 10 be an infrared diode of the detection chip 1, which operates inversely and whose cathode forms the source 42 of the input FET transistor 41 of the direct injection processing circuit. The biassing gate of transistor 41 is shown at 43. A plate 44, at a storage potential, creates in substrate 40 a first storage well 45 forming the drain of transistor 41. The drain 45 of transistor 41 forms the source of a second socalled dump FET transistor 46. On the other side of the storage plate 44, with respect to the gate 43 of transistor 41, is disposed a plate 47 at a given potential for creating thereunder a second storage well 48 forming the capacitor of the first integrator 16 of FIG. 3. A plate 49 at a transfer potential controlled by the variable cyclic ratio clock 17, between plates 44 and 47, above a space 51 in substrate 40, during the above-mentioned time t, allows the charges to be transferred from the first well 45 to the second well 48, by creating a spaced charge connecting the two wells 45,48 together. Beyond the time t, during the interval (T-t), and with the action of plate 49 inhibited, the remaining charges in the first well 45 flow through the transistor 46 into a second capacitor 50, shown in FIG. 8. Transistor 46 and the second capacitor 50 form the second so-called dump integrator 57 of FIG. 3, the function of switch 18 of FIG. 3 being ensured by the transfer plate 49. In FIG. 8 has been shown the electric diagram of elements 40-50. The charge amount Qij mentioned with reference to FIG. 1 is therefore stored in well 48. It will be noted that the transistors 41, 46 behave like current generators for storing charges in the capacitors 45, 48 and 45,50.

It will again be emphasized here that the silicon chip comprises as many input circuits, like the one which has just been described, as there are detection diodes.

Downstream of well 48 are disposed, above the substrate, 40, spaced electrode plates 60 to which a voltage is applied in a manner which is staggered in time so as to form the delay line 12. In actual fact, the conversion into a voltage of the charge amounts is provided not in the converter 19 but directly at the level of an output diode 61, downstream of the delay plate 60, diode 61 forming with the substrate 40 a conversion capacity Cij. The output cathode of diode 61, under which the charge amount Qij is situated. is then at a potential $$Vij = \frac{Qij}{Cij}.$$

All the cathodes of the output diodes associated respectively with the photodiodes of the same line are connected together and to a voltage source $V_f$ through an FET transistor 62 for fixing the potential of the cathodes of diodes 61, so that the potential of the line 63 connecting together the cathodes of diodes 61 equal to $$V_f - \frac{\Sigma Qij}{\Sigma Qij} = V_i$$

It is then at the level of line 63 connecting together the cathodes of diodes 61 that the summation Qi is made of the charge amounts associated with the photodiodes of the same line.

With the voltage information on line 63 under a high impedance, the impedance is lowered by means of a matching stage having two FET transistors 64,65 in series, the voltage $V_f$ being applied to the source of transistor 64, the gate of transistor 64 being connected to line 63 and the drain of transistor 65 being grounded.

Above the silicon substrate are disposed two metal plates, at different levels, spaced from each other by an insulating layer, like the first plate of the substrate, so as to form the connecting capacitor 21 which has already been discussed. This capacitor 21 is connected to the connection point of the matching transistors 64,65 and to a so-called reference FET transistor 66. To the source of transistor 66 is applied the voltage $V_{ref}$ which is re-transmitted to a plate 67 forming the gate of the input transistor 68 of the multiplexer, corresponding to the line of photodiodes considered. Each input transistor 68 includes an input diode 70, whose cathode 71 is voltage controlled so as to play the role of switch 24 mentioned above and thus provide multiplexing. The transistor 66 provides the function of reference voltage generator 20, also mentioned above, the control of its gate 72 playing the role of switch 22. It is then the sensor 23 sensing the position of the scanning mirror which controls the gate 72 of transistor 66 and the cathode 71 of the input diode 70 of the multiplexer. Downstream of the gate 67 of the input transistor 68 of the multiplexer is disposed a storage and transfer plate 73 for the multiplexing properly speaking of the potentialized charge amounts Qi, under which extends a storage and transfer well 74. Between the two adjacent transfer plates 73 of two adjacent input transistors 68 of the multiplexer corresponding to two lines of photodiodes, are disposed isolating electrodes. Thus, the storage and transfer wells 74 associated with all the lines of photodiodes respectively are disposed one after the other. It is only by clock phases applied to lines 73 that the charges of one well 74 are transferred to the adjacent well and so on up to the output well. Control of the cathodes 71 is provided first of all for saturating the transistors 68 before emptying their storage and transfer wells 74 to the level corresponding to the voltage Vi. This is a well known spill and fill technique.

It will be noted that a gain may be obtained at the input of the multiplexer for, with a voltage equal to a charge amount divided by a capacity, and with the voltage remaining constant, it is sufficient to increase the capacity so as to increase the charge amount.

If we increase the capacities associated with all the lines of photodiodes in the same ratio, the relativity of the information of the lines of photodiodes remains intact, which is the essential thing.

In order to be able to neglect any fixed spatial noise error due to the multiplexer, the input signals of the multiplexer must have greater dynamics than the dispersion of the threshold voltages of the input transistors.

What is claimed is:

1. A thermal parallel scan camera including a chip of infrared detection diodes disposed in lines and a chip for processing the detection signals having means for integrating the output currents of the detectors and for delivering detection charge amounts associated with each of the lines of detectors, the two chips being hybridized, which camera further includes means for controlling the gain of the detected and processed siganls and means, including a conversion means, for converting the charges into voltages, connected to a reference voltage generator by a capacitive connection, and means for showing to the detection diodes a uniform reference background at a given temperature during each scan return, for determining, for each line of detectors, the difference between the detection charge amounts and the charge amounts associated with the reference background, the integration means comprising a first storage integrator and a second dump integrator connected alternately to their associated detector by a switch.

2. The camera as claimed in claim 1, wherein said control means are automatic gain control means adapted for controlling, as a function of the mean amplitude of the detected and processed signals, the means for integrating the output currents of the detectors.

3. The camera as claimed in claim 1, wherein said control means are adapted for controlling the integration time of said integration means by means of a clock with variable cyclic ratio.

4. The camera as claimed in claim 1, wherein means are provided, following the integration means, for rephasing the signals delivered by the detectors, integrated and controlled, and palliating the geometric dispersion of the detectors.

5. The camera as claimed in claim 1, wherein the information delivered by said means for determining the charge difference associated with the different lines of detectors respectively are multiplexed in a multiplexer connected to a display device.

6. The camera as claimed in claim 1, wherein the means for integrating the output currents of the detectors include input field effect transistors of the processing chip, connected directly to their respective detectors.

7. The camera as claimed in claim 6, wherein the input field effect transistors are integrated in a silicon substrate, they each include a storage well as drain and are each followed by a space arranged to be filled with minority carriers under the action of a transfer plate and a second storage well, the drain of the input transistors forming the source of dump field effect transistors.

8. The camera as claimed in claim 7, wherein the potential of the transfer plate is controlled by said gain control means.

9. The camera as claimed in claim 7, wherein the cathodes of output diodes in the silicon substrate are connected together by a voltage charge conversion line.

10. The camera as claimed in claim 7, wherein said silicon substrate includes multiplexing field effect tranistors to the gates of which a reference voltage may be applied.

11. The camera as claimed in claim 10, wherein the multiplexing transistors each include an input diode to the cathode of which a multiplexing voltage is applied.

12. The camera as claimed in claim 11, wherein the voltage of the cathode of the input diodes of the multiplexing transistors and the voltage of their gate are controlled by a sensor sensing the position of a scanning mirror.

* * * * *